United States Patent [19]
Oxford

[11] Patent Number: 4,892,323
[45] Date of Patent: Jan. 9, 1990

[54] ALL-TERRAIN WHEELCHAIR

[76] Inventor: Stuart G. Oxford, 7817 Crown Point Ave., Omaha, Nebr. 68134

[21] Appl. No.: 263,417

[22] Filed: Oct. 27, 1988

[51] Int. Cl.$^4$ .......................... B62M 1/14; B62M 1/16
[52] U.S. Cl. .................................. 280/250.1; 105/129; 152/523; 180/7.5; 238/13; 280/253; 280/272; 280/288; 280/304.1
[58] Field of Search ...................... 280/250.1, 253, 272, 280/304.1, 288.1; 180/7.5; 238/13; 105/129; 254/418, 422, 104; 152/208, 210, 151, 246, 523

[56] References Cited

U.S. PATENT DOCUMENTS

| | | | |
|---|---|---|---|
| 244,084 | 7/1881 | Steinly | 105/129 |
| 441,409 | 11/1890 | Hardy | 280/272 |
| 579,664 | 3/1897 | McConley | 280/272 |
| 790,853 | 5/1905 | Redd | 105/129 |
| 913,625 | 2/1909 | David | 105/129 |
| 963,857 | 7/1980 | Broomhall | 254/323 |
| 1,270,104 | 6/1918 | Benton et al. | 180/7.5 |
| 3,042,131 | 7/1962 | Dovci | 180/41 |
| 3,301,574 | 1/1967 | Good | 280/211 |
| 3,309,110 | 3/1967 | Bulmer | 280/250.1 |
| 3,877,725 | 4/1975 | Barroza | 280/250.1 |
| 3,994,509 | 11/1976 | Schaeffer | 280/250.1 |
| 4,138,131 | 2/1979 | Sommer | 280/220 |
| 4,354,691 | 10/1982 | Saunders et al. | 280/250.1 |
| 4,558,878 | 12/1985 | Motrenec | 280/272 |
| 4,682,784 | 7/1987 | Anderson | 280/250.1 |
| 4,754,825 | 7/1988 | Sheffee | 180/7.5 |

FOREIGN PATENT DOCUMENTS 863541 1/1941 France .................................. 280/253
23071 of 1906 United Kingdom ................. 152/208

OTHER PUBLICATIONS

Don Kreb's "Access to Recreation" pp. 8 & 16.

Primary Examiner—Mitchell J. Hill
Attorney, Agent, or Firm—Zarley, McKee, Thomte, Voorhees & Sease

[57] ABSTRACT

An all-terrain wheelchair includes a frame which has a steering platform attached to the forward most portion. The steering platform has an operable ground-engaging pneumatic wheel which is controlled by a steering handle. The steering handle may be selectively locked in a fixed position by an operable locking mechanism. A seat is attached to the rearward portion of the frame. Attached to the frame on each side of the seat is an elongated axle with a large diameter, ground-engaging wheel. Each wheel has a plurality of uniformly spaced tubular members secured to the outer peripheral sides of each wheel and extending horizontally outwardly therefrom. A removably attached arm on each axle can be operably engaged with the tubular members to cause forward or rearward motion of the vehicle. An operable winch is mounted forwardly of the seat on the frame.

6 Claims, 3 Drawing Sheets

ALL-TERRAIN WHEELCHAIR

TECHNICAL FIELD

This invention relates generally to wheelchairs and more specifically to a wheelchair which may be utilized on all types of terrain.

BACKGROUND OF THE INVENTION

The conventional wheelchair is comprised of two large diameter, ground engaging, narrow width, pneumatic rear wheels mounted on an axle positioned beneath the seat portion of the chair with smaller diameter, narrow width, pneumatic, ground engaging wheels positioned forwardly of the rear wheels. The front wheels are pivotally mounted to vertical stanchions and generally are not able to be locked in any particular angular position. The occupant of the wheelchair is seated in a conventional fashion such that the lower portion of the occupant's legs will be generally perpendicular to the ground.

The operator of the conventional type wheelchair, when using the wheelchair off-road, is faced with a number of problems. The greatest problem is the instability caused by a high center of gravity. The wheelchair may topple over backwards when negotiating steep grades. When laterally traversing a steep incline, the wheelchair may tip sideways. Furthermore, when traversing downwardly, the occupant risks sliding out of the chair and/or having the chair become unbalanced and having the chair pitch forward.

The conventional wheelchair faces additional difficulties when traversing uneven surfaces or negotiating obstructions in the path. One difficulty is in being unable to proceed any further when a wheel becomes stuck in a depression, such that when the occupant attempts to free himself, the chair may be upset. A similar problem, with the same consequences, occurs when attempting to traverse obstructions—rocks, logs or curbs —in the pathway.

A further problem with the conventional wheelchair is that the user is unable to generate enough sustained human power to climb steep grades. If electric power is used, the battery and transmission make the wheelchair heavy and unwielding. Thus, the conventional wheelchair has limited capability for traversing inclines.

Another type of wheelchair is the sport model. Unlike the conventional model, the occupant's knees are bent upward such that the feet rest nearly in the same plane as the buttocks. The sport model wheelchair typically has a slightly longer wheel base, a slightly lower center of gravity and the hind wheels are slightly wider apart than the regular wheelchair. Sport wheelchairs may or may not have two front pneumatic ground engaging tires which have a tread width wider than the average rear pneumatic wheelchair tire. However, in the sport model, the outside diameter of the rear wheel is usually consistently as large as that of the regular wheelchair.

The sport wheelchair, however, faces problems similar to the conventional wheelchair when utilized off-road and in a steep incline situation. The sport model, while far more stable than the conventional wheelchair, still suffers problems in traversing a steep grade.

Both types of wheelchairs typically use narrow width pneumatic tires which are easily subject to puncture by branches, rocks and the like. When utilized in sandy, loose and unstable soil, the wheels sink and the occupant is stranded.

To lessen the puncture and traction problems several solutions have been propounded. One solution has been to mount an additional rear wheel to each side of the existing rear wheels, or to utilize a metal rear wheel. While the utilization of two adjacent wheels provides better traction, the puncture problem continues to exist and there are still some problems with sinking into soil. The metal wheel, while less likely to sink, lacks traction, and is incredibly uncomfortable for the user.

It is therefore an object of the present invention to provide an improved all-terrain wheelchair.

Another object of the present invention is to provide a wheelchair which may be utilized on all types of terrain.

Another object of the present invention is to provide a wheelchair having a low center of gravity, thereby increasing the stability thereof.

A further object is to provide a wheelchair with a means associated therewith to selectively lock the front steering wheel in a fixed angular position, thereby freeing the wheelchair user from having to continuously manually control the steering.

An additional object is to provide a wheelchair with a winch and cable extending therefrom which is used to propel the wheelchair when human power is not sufficient.

Still another object is to provide a wheelchair with means associated therewith to permit increased power to be supplied to the drive wheels thereof to overcome obstacles or steep inclines.

These and other objects will be apparent to one skilled in this art.

SUMMARY OF THE INVENTION

The all-terrain wheelchair of the present invention includes a frame comprised of two elongated generally parallel rails. Attached to the forward most portion of the frame rails, and elevated above the upper surface of the frame rails, is a steering control plat form with a single, operable ground-engaging wheel. The ground engaging wheel is controlled by an operable steering handle which may be selectively locked into a fixed angular position.

A seat is positioned on the rearward portion of the frame members. Positioned on each side of the seat is an axle with a large diameter ground engaging rear wheel attached thereto. The ends of the axles protrude beyond the outer peripheral surface of the wheel. Each wheel has a hand-actuated brake.

Each wheel has a plurality of uniformly spaced tubular members extending outwardly from the sides thereof. The tubular members are at the same radial distance from the center of the wheel. Each axle has a removably attached arm which is operably and independently pivotally movable in a universal joint-like fashion about the axle. When the arm is operably engaged with the tubular members affixed to the wheels, a forward or rearward thrusting motion is produced.

A winch is mounted on the wheelchair forwardly of the seat.

DESCRIPTION OF THE PREFERRED EMBODIMENT

Figure 1:
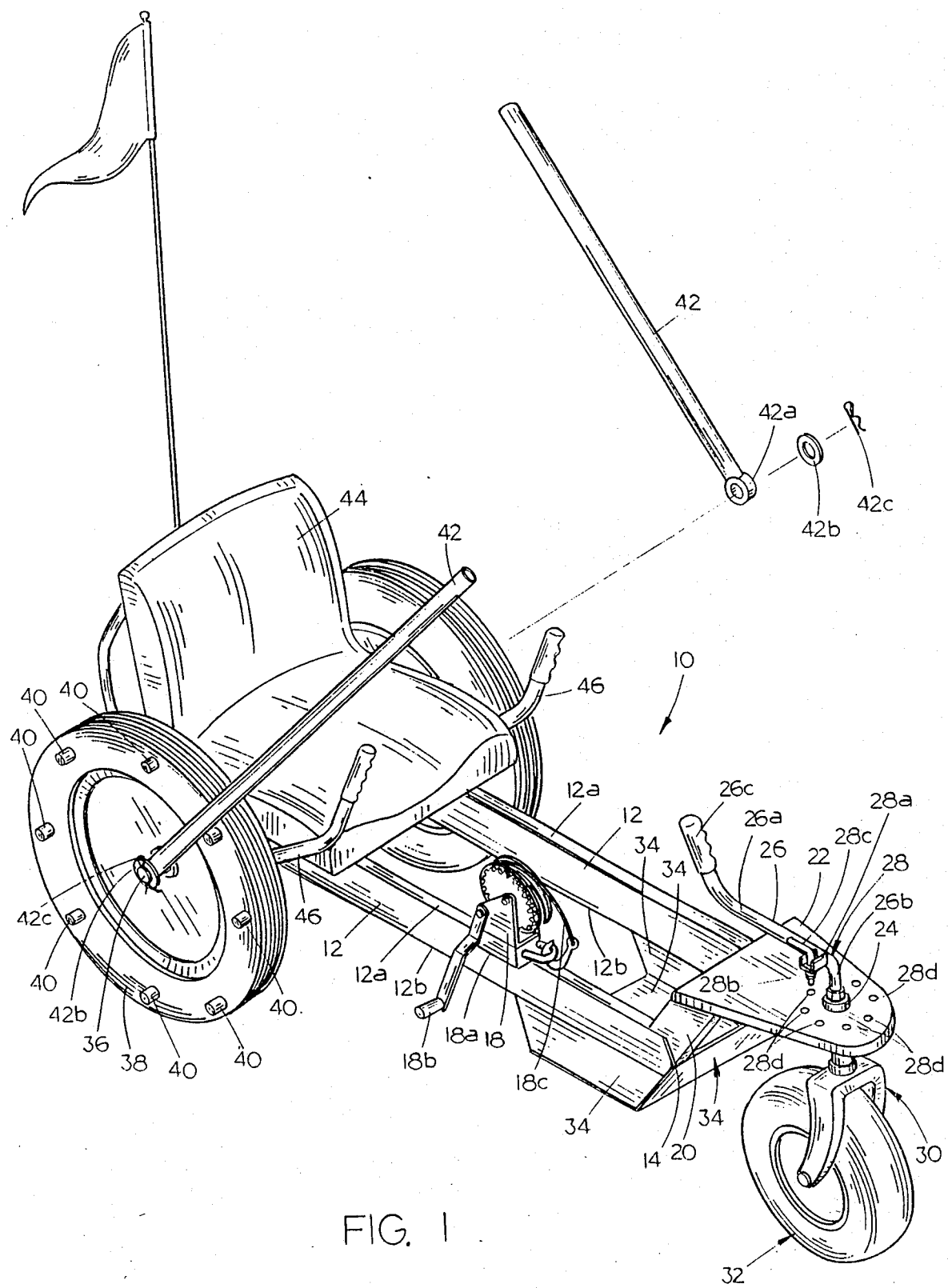
FIG. 1 is a perspective view of the invention.

Referring now to the drawings wherein identical or corresponding parts are identified by the same reference numeral, the all-terrain wheelchair of this invention is identified generally at 10, and includes two generally parallel elongated frame members 12 having upper surfaces 12a, lower surfaces 12b, forward ends 14, and rearward ends 16.

A hand operated winch 18 with a cable 18c has a removable handle 18b, and is bolted to one of frame members 12. The winch 18 may be positioned either on the left or the right hand frame member 12 depending upon the user's preference. A foot rest 34 is positioned on the lower surface 12b of the frame rails 12.

A pair of support risers 20 are mounted on the forward portion 14 of the frame members 12. A steering platform 22 is attached to risers 20, and extends forwardly therefrom, so as to be raised above the upper surface 12a.

An L-shaped steering handle 26 is rotatably mounted through a steering mount 24 in steering platform 22. The vertical leg 26b of handle 26 extends downwardly through steering mount 24 and is connected to a ground engaging wheel assembly 30. Wheel assembly 30 is comprised of a wide tread, balloon tire 32 rotatably mounted on an axle which is secured to a yolk as shown in FIG. 1.

Figures 2, 3:
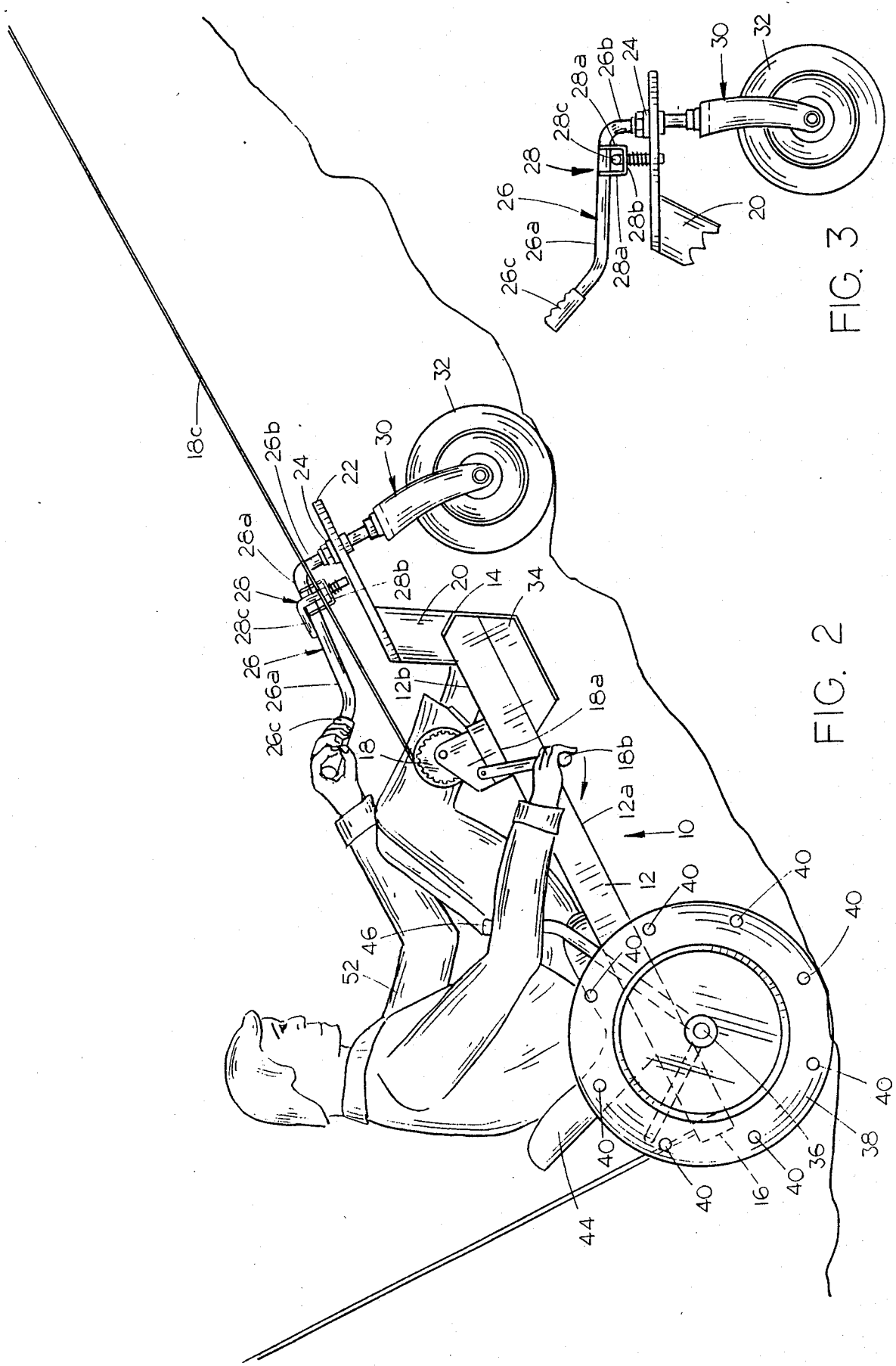
FIG. 2 is a side view of the invention with occupant and utilizing the winch and steer control.
FIG. 3 is a side view of the steering control and locking mechanism.
Figure 4:
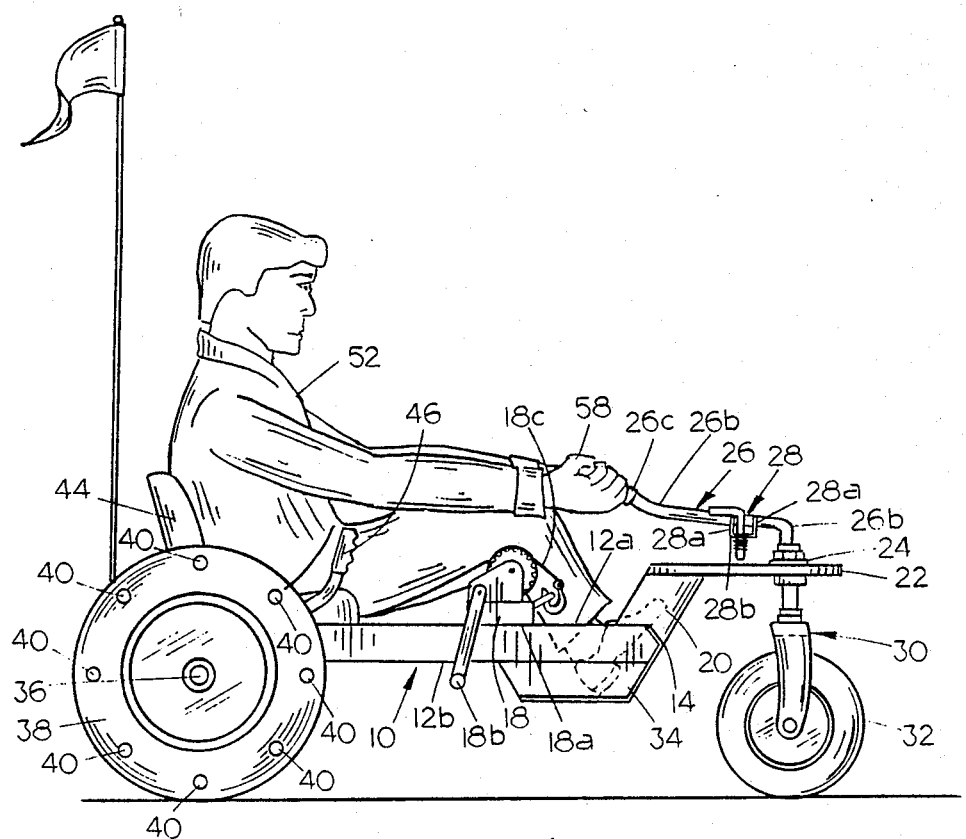
FIG. 4 is a perspective view of the invention with the steering in the free mode.

The horizontal leg 26a of steering handle 26 has a slight upward curvature. At the upper end, a grip 26c is attached thereto. A steering locking mechanism, generally identified as 28, is mounted on horizontal leg 26a of steering handle 26, and allows the occupant to selectively lock the steering handle 26 in a fixed angular position. Locking mechanism 28 includes an open trough having two legs 28a and a base 28b. A hole (not shown) in the base 28b has an L-shaped pin 28c rotatably mounted therein. Pin 28c is spring loaded so as to bias the pin downwardly as shown in FIG. 3. On the steering platform 22, there are holes 28d drilled therethrough and are aligned to receive the pin 28c. When pin 28c is rotated with the upper end parallel to trough legs 28a, the lower end of pin 28c will lock within a hole 28d. Pin 28c is disengaged by lifting the pin and rotating it to rest against the top of a leg 28a. In this position, handle 26 may be freely moved.

An axle 36 is mounted on each side of frame members 12, at the rearward end, and has a wheel 38 thereon. A seat 44 is fixed to frame members 12 between the rear wheels 38, and two brake actuators 46 are mounted on each side to selectively stop the adjacent wheel 38. Each wheel has a large-diameter, wide-width pneumatic tire thereon with a plurality of radially spaced tubular members 40 mounted on the outer peripheral rim of the rubber portion of the tire. These tubular members 40 may be grasped by the occupant to provide a forward or rearward thrusting force or may be operably engaged by an elongated arm 42.

Each elongated arm 42 has a circular bushing 42a at one end. The bushing is larger in diameter than axle 36, thereby allowing the arm 42 to pivot slightly out of a vertical plane. Arms 42 are removably attached to axles 38 by the use of a washer 42b and cotter key 42c which is inserted through a hole (not shown) in the end of axle 38.

Figure 5:
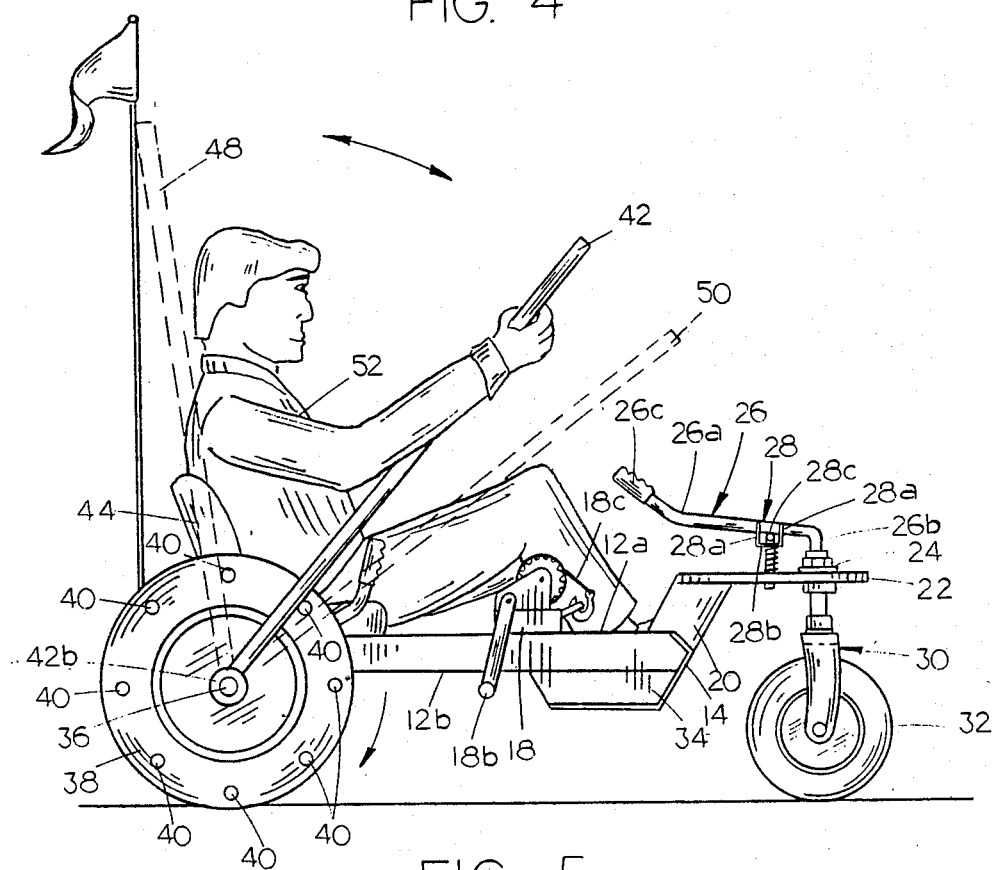
FIG. 5 shows a perspective view of the invention with the occupant utilizing the elongated arms for powering the vehicle, and the steering in the locked mode.

Referring now to FIG. 5, the arms 42 are utilized between two positions 48 and 50, to achieve forward motion. The occupant 52 first pushes arms 42 in an outward and backward motion towards the rear of the all-terrain cycle to position 48. Then, arms 42 are pulled inwardly and forward until one of the tubular members 40 is engaged. The occupant 52 then presses in a forward and downward manner applying torque against the tubular member 42 and moves the all-terrain wheelchair forward. Rearward motion is obtained by reversing the process.

Referring now to FIG. 2, the winch 18 is used in those situations where the all-terrain wheelchair is traversing rough or unstable terrain and/or going up or down a steep hill. The occupant extends the cable 18c from the winch and attaches the end (not shown) to an immovable object located somewhere on the path and then proceeds to operate the winch. Attachment of the cable end can be by the user or another individual on the path.

It is thus seen that the invention accomplishes all of the stated objectives.

I claim:

1. An all-terrain wheelchair comprising:
   an elongated frame means having rearward and forward ends;
   a pair of laterally extending axle members positioned adjacent to the rearward end of said frame menas;
   a pair of wheels rotatably mounted on said axle members and positioned laterally of the rearward end of said frame means;
   a seat means on said frame means positioned between said wheels;
   a ground engaging steerable wheel mounted at the forward end of said frame means;
   a steering means connected to said steerable wheel for steering said steerable wheel;
   each of said wheels of said pair of wheels having a plurality of radially spaced apart tubular members secured thereto which extend horizontally outwardly therefrom and which are disposed parallel to the axis of rotation of said wheels;
   and a pair of elongated arms selectively removably secured at one end thereof to said axle members for selective engagement with said tubular members to permit the user of the wheelchair to apply additional propelling force to the wheels through the use of said arms.

2. The wheelchair of claim 1 wherein said steering means further includes a means for selectively locking said steering wheel in at lesat one position so that the user of the wheelchair dows not have to manually control the steering of the steering wheel as the wheels are being propelled.

3. The wheelchair of claim 1 wherein awinch means is operatively secured to said fram emeans, said winch means including a manually operable mechanical winch having a winch cable wound thereon for extension therefrom.

4. An all-terrain wheelchair comprising:
   an elongated frame means having rearward and forward ends;

a pair of laterrally extending axle members positioned adjacent to the rearward end of said frame means;

a pair of wheels rotatably mounted on said axle members and positioned laterally of the rearward end of said frame means;

a seat means on said frame means positioned between said wheels;

a ground engaging steerable wheel mounted at the forward end of said frame means;

a steering means connected to said steerable wheel for steering said steerable wheel;

each of said wheels of said pair of wheels having a plurality of radially spaced apart tubular members secured thereto which extned horizontally outwardly therefrom and which are disposed parallel to the axis of rotation of said wheels, said tubular members having a length sufficient to enable the user to selectively grasp one of the tubular members to rotate said wheels.

5. The wheelchair of claim 4 wherein said steering means further includes a means for selectively locking said steering wheel in at least one position so that the user of the wheelchair does not have to manually control the steering of the steering wheel as the wheels are being propelled.

6. The wheelchair of claim 4 wherein a winch means is operatively secured to said frame means, said winch means including a manually operable mechanical winch having a winch cable wound thereon for extension therefrom.

* * * * *